April 4, 1961    W. W. CUSHMAN    2,978,119
QUICK DEFLATING MEANS FOR PNEUMATIC DUNNAGE
Filed Sept. 3, 1959
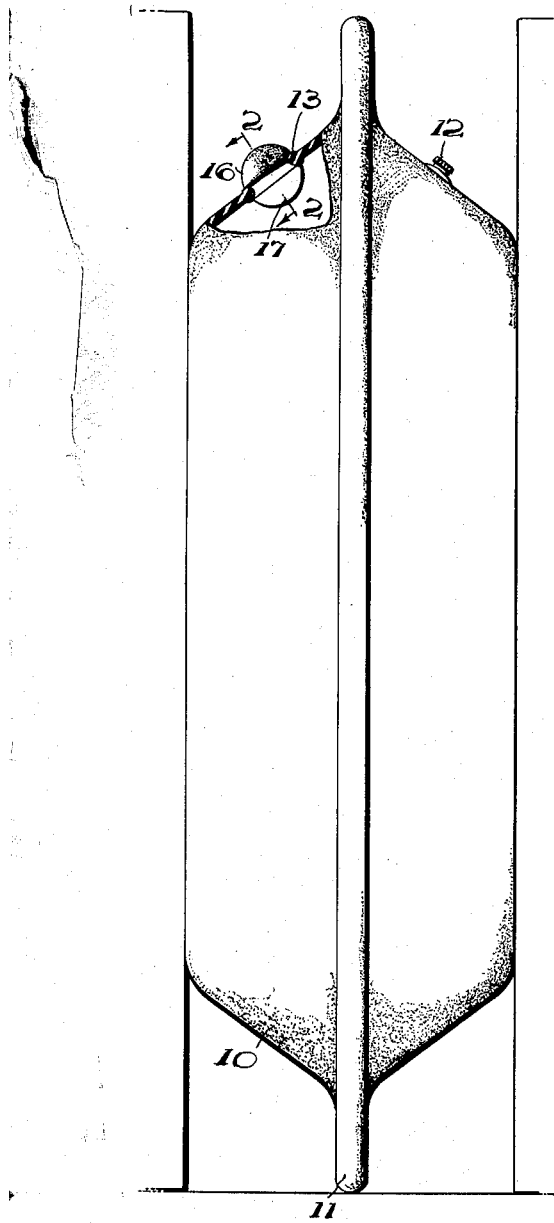
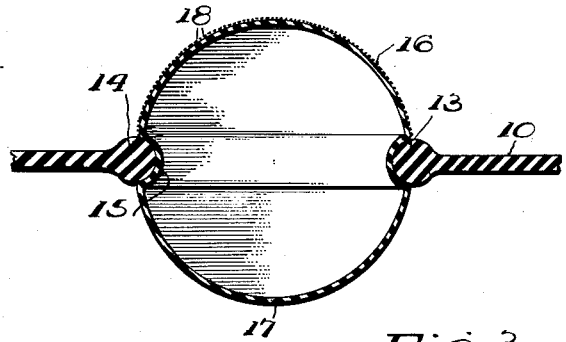
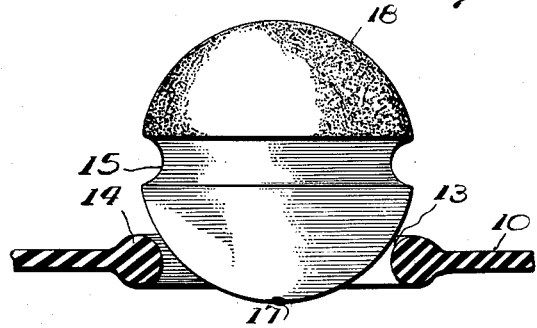
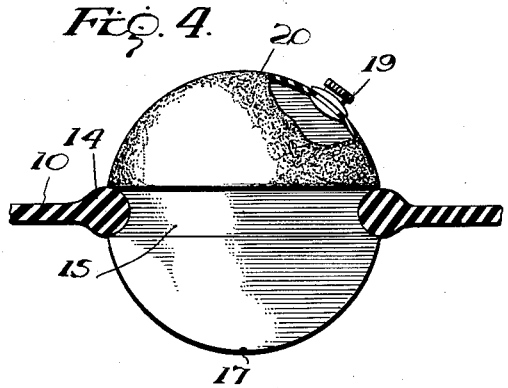
INVENTOR
Walton W. Cushman
BY W. J. Eccleston,
ATTORNEY ium
2,978,119
QUICK DEFLATING MEANS FOR PNEUMATIC DUNNAGE Walton W. Cushman, Webb City, Mo.

Filed Sept. 3, 1959, Ser. No. 838,002

5 Claims. (Cl. 214—10.5)

(Granted under Title 35, U.S. Code (1952), sec. 266)

The invention described herein, if patented, may be manufactured and used by or for the Government for governmental purposes, without the payment to me of any royalty thereon.

This invention relates to inflatable devices and primarily to such devices when used in the shoring of merchandise in freight cars and the like.

In the shoring of cargo by the use of pneumatic dunnage, it is usual to handle the inflatable articles while in deflated condition and to inflate them after they have been placed in contact with the cargo to be shored. It is a well-known fact that a much longer time is ordinarily required to deflate a collapsible container than to inflate it, and a primary object of the present invention resides in so constructing the piece of pneumatic dunnage that it may be almost instantly deflated when desired.

A further object of the invention resides in providing an extremely simple and inexpensive modification of a piece of pneumatic dunnage so that the same may be readily and quickly deflated without the use of tools or other time-consuming operations.

Other objects and advantages of the invention will be apparent from the following description when taken in connection with the accompanying drawings in which, Figure 1 is an edge view of the novel piece of pneumatic dunnage, partly broken away and disposed in its operative position between two pieces of cargo;

Figure 2 is a sectional view on the line 2—2 of Figure 1 looking in the direction of the arrows and showing the manner in which the hollow ball is fitted into the air discharge opening of the flexible container;

Figure 3 is a detail view showing the ball after it has been collapsed and removed from the air discharge opening of the flexible container; and Figure 4 shows a modification in which the valve for inflating the piece of pneumatic dunnage is located within the hollow ball rather than in the body of the flexible container.

Referring to the drawings in greater detail and by reference numeral, the numeral 10 indicates the flexible container which is formed of air-impervious material and shown as formed in two sections welded together and forming a circumferential rib 11. The valve 12, situated in the body of the container, in Fig. 1, is used for inflating the container to a pressure of about 5 p.s.i. The latter is also formed with a discharge opening 13 to permit the ready discharge of air from the container when it is to be removed from its operative position as indicated in Fig. 1 so as to permit the removal of the cargo from a freight car or the like in which the pneumatic dunnage has been employed in shoring up the cargo against damage. As clearly indicated in Fig. 2, the discharge opening 13 in the flexible container is provided with a surrounding rib or bead 14 and the sealing ball 16 which serves to releasably close the opening 13 is provided with an annular groove 15 having a radius of curvature approximating that of bead 14, the ball being otherwise of a diameter greater than that of the opening 13. The elastic ball 16 is somewhat similar to a child's toy ball in that it is collapsible and provided with an aperture 17 so that it may act like a syringe when it is collapsed and allowed to expand. It will be noted that the sealing ball when in position in the flexible container is located in the opening 13 and the outer surface of the outer half of the ball is preferably roughened or stippled, as indicated at 18, to provide a better grip for the fingers of the operator when he desires to collapse the ball to remove it from the container 10. In the modified construction of the piece of pneumatic dunnage, the valve 19 may be positioned in the ball 20 rather than in the body of the container, but otherwise is identical with the elastic ball heretofore referred to with regard to the description of Figs. 1, 2, and 3. In other words, the inflatable container 10 may be readily inflated whether the valve is located in the body of the container or in the ball itself.

In the operation of the device, the piece of dunnage is placed in the shipping container between pieces of cargo, or between the cargo and the wall of a shipping vehicle in collapsed condition and is thereafter inflated through the medium of valves 12 or 19 so as to be expanded into the condition shown in Fig. 1 and thus tightly hold the cargo against shifting during its transportation from one point to another. Due to the large area of contact between the pneumatic dunnage and the cargo, the pressure required is rather low being of the order of about 5 lbs. per square inch.

As stated at the outset, the discharge of air through a valve is much slower than when it is being received through the valve for inflating the container and, inasmuch as the container must be frequently deflated for unloading purposes and also for the preparation of shipping dunnage from one place to another, it is desirable that some means be provided for quickly deflating them.

Such a rapid means for deflating the containers is provided by means of the elastic balls 16 and 20 which are positioned in the openings 13 of the containers and held therein by reason of the annular groove 15 receiving the bead 14 of the container so that they are interlocked, as shown in Figs. 1, 2, and 4. It will be understood that by reason of the opening 17 in the sealing balls, the pressure within the containers 10 is also present within the sealing ball 16. Consequently, due to this low pressure within the ball 16, it may be readily collapsed by pressing on the roughened or stippled surface 18 so as to eject the air therefrom through the opening 17 into the container 10. The ball as thus collapsed may be withdrawn from the opening 13 and thereby permit a rapid discharge of air from the bag, so that it will collapse and can be readily removed from its position within the shipping container. This same operation can be followed in connection with the ball 20 in the modified form shown in Fig. 4 in which the inflating valve 19 is located in the ball itself.

From the foregoing description taken in connection with the accompanying drawings, it will be apparent to those skilled in the art, that I have devised an exceedingly simple and inexpensive means by which conventional pneumatic dunnage may be quickly removed from its shoring position by reason of its quick deflation, and that such means is simple in operation and may be performed by an unskilled person without the use of tools or other time-consuming features.

According to the patent statutes, I have described what I now consider to be the preferred forms of the construction but inasmuch as various minor details may be incorporated therein without departing from the spirit of the invention, it is intended that all such variations be included within the scope of the appended claims.

I claim:
1. A piece of pneumatic dunnage including a flexible air-impervious container having an opening therein, a hollow rubber ball fitted in said opening and having an opening communicating with the interior of the container, whereby the ball may be removed from the opening in the inflated container by first collapsing the ball.
2. A piece of pneumatic dunnage including a flexible air-impervious container having a circular opening therein formed with a bead surrounding the opening, a hollow rubber ball of greater diameter than the diameter of the opening and provided with an annular groove about its mid-portion receiving said bead, and an opening communicating with the interior of the container, whereby the ball may be removed from the opening in the inflated container by first collapsing the ball.
3. A piece of pneumatic dunnage including a flexible air-impervious container having an opening therein, a hollow rubber ball fitted in said opening and having an opening communicating with the interior of the container, and a valve for use in inflating the container, whereby the ball may be removed from the opening in the inflated container by first collapsing the ball.
4. A piece of pneumatic dunnage including a flexible air-impervious container having a circular opening therein formed with a bead surrounding the opening, a hollow rubber ball of greater diameter than the diameter of the opening and provided with an annular groove about its mid-portion receiving said bead and an opening communicating with the interior of the container, and a valve for use in inflating the container, whereby the ball may be removed from the opening in the inflated container by first collapsing the ball.
5. A piece of pneumatic dunnage including a flexible air-impervious container having a circular opening therein formed with a bead surrounding the opening, a hollow rubber ball of greater diameter than the diameter of the opening and provided with an annular groove about its mid-portion receiving said bead and an opening communicating with the interior of the container, and a valve mounted in the exposed portion of the ball for use in inflating the container, whereby the ball may be removed from the opening in the inflated container by first collapsing the ball.

References Cited in the file of this patent

UNITED STATES PATENTS

| | | |
|---|---|---|
| 2,086,925 | Schwidetzky et al. | July 13, 1937 |
| 2,714,011 | Albee | July 26, 1955 |
| 2,841,166 | Auzin | July 1, 1958 |